INVENTORS.
CHARLES E. GRAY
JOHN F. MORGAN — AND —
ANDREW O'NEAL
BY Wm. H. Dean

March 2, 1965 C. E. GRAY ETAL 3,171,371
SEED PLANTER
Filed July 19, 1962 2 Sheets-Sheet 2
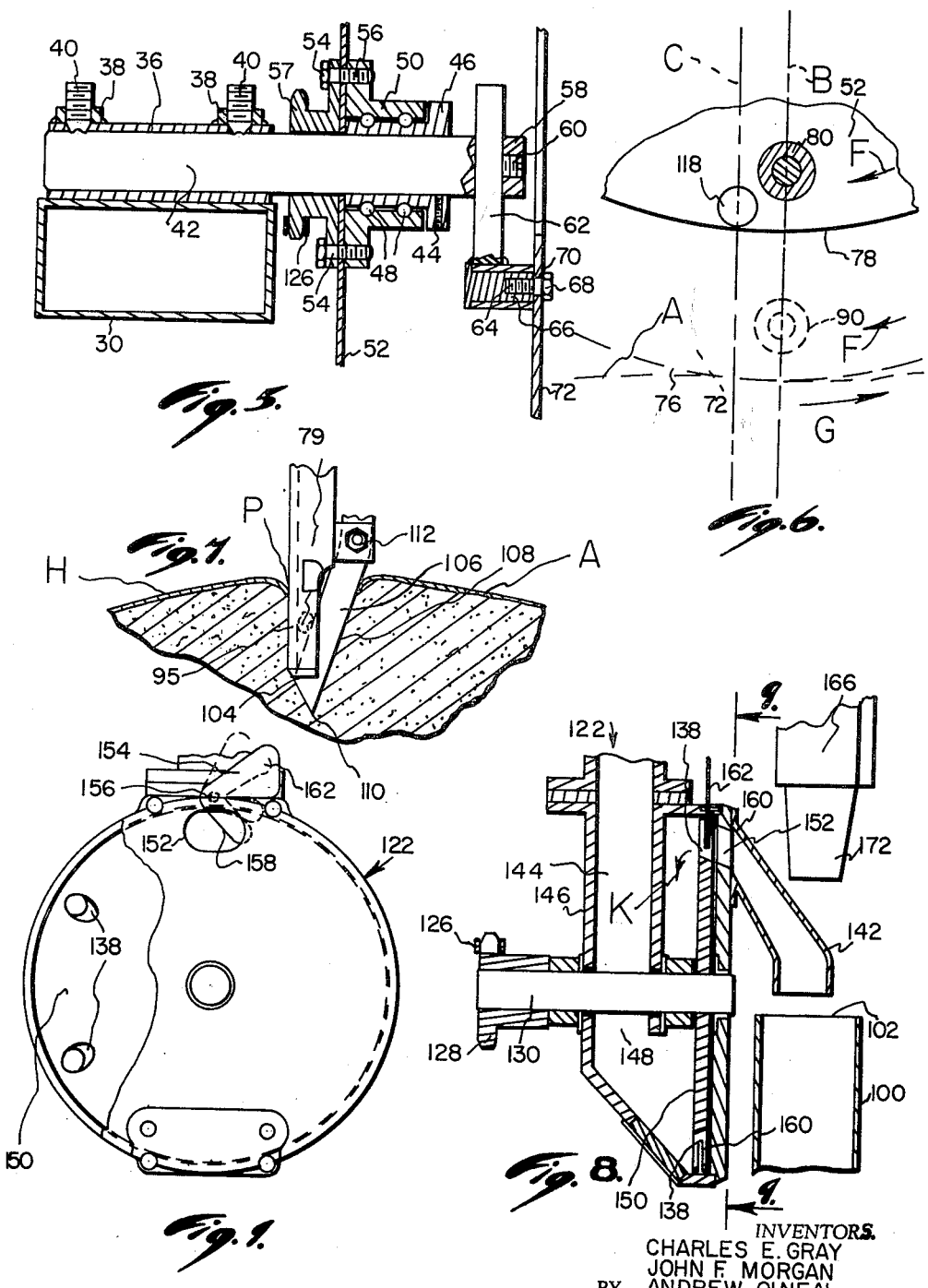
INVENTORS.
CHARLES E. GRAY
JOHN F. MORGAN
BY ANDREW O'NEAL
Wm. H. Dean

United States Patent Office 3,171,371
Patented Mar. 2, 1965

3,171,371
SEED PLANTER
Charles E. Gray, Tolleson, and John F. Morgan and Andrew O'Neal, Phoenix, Ariz., assignors, by mesne assignments, to Union Carbide Corporation, a corporation of New York
Filed July 19, 1962, Ser. No. 210,957
12 Claims. (Cl. 111—91)

This invention relates to a seed planter and more particularly to a seed planter capable of planting through plastic mulch covers after such covers have been laid over the upper surface of a seed planting row of soil. Further, the invention relates to a seed planter capable of perforating such plastic mulch covers directly above an area in which the planter subsequently plants a seed whereby a plant will grow upward through the perforation in the plastic mulch cover made by the planter of the present invention.

Thin plastic film mulch covers, when placed over planting rows of soil, hold moisture therein and tend to maintain a higher temperature in the soil during early seasons whereby germination, plant growth and early crop yields are augmented.

It has heretofore been a problem to plant seeds in the soil below such plastic mulch covers and accurately to provide for the growth of plants from the seeds upwardly through openings in such plastic mulch covers.

Under the foregoing conditions, it has heretofore been necessary manually to plant seeds through such plastic mulch covers by first perforating the cover and piercing the soil, then subsequently dropping a seed in the cavity below the opening in the cover and then pouring a covering material over the seed to enclose it in the soil directly below the opening in the plastic mulch cover.

Accordingly, it is an object of the present invention to provide a seed planter which operates at a high rate longitudinally of plant rows of soil and which automatically perforates plastic mulch covers and pierces cavities in the soil therebelow while dispensing seeds and covering material into the pierced cavities in the soil directly below the openings in the plastic mulch cover.

Another object of the invention is to provide a novel ground driven self-contained automatic seed planter which is capable of efficiently planting and covering seeds through conventional plastic mulch cover strips after they have been placed over planting rows of soil.

Another object of the invention is to provide a seed planter having novel mechanism for efficiently piercing plastic mulch covers then subsequently expanding a cavity in soil below the pierced portions of the cover and then subsequently depositing a seed in the bottom of the soil cavity and then covering the seed with material to enclose the seed in the soil below the opening in the mulch cover.

Another object of the invention is to provide a seed planter having a novel seed dispenser which operates in coordination with a plurality of mulch cover piercing needles actuated in connection with a pair of eccentric plates rotatable in unison to hold the soil piercing needles in substantially vertical disposition.

Another object of the invention is to provide a novel seed planter having a plurality of hollow needles provided with hoppers on their upper ends and actuated in connection with a pair of discs eccentrically mounted relative to each other on displaced axis and wherein one of said discs is a ground-engaging wheel operable to drive both discs in unison to maintain the axes of the soil piercing needles in a substantially vertical plane.

Another object of the invention is to provide a seed planter having novel means for planting seed and covering material through a conventional plastic mulch soil cover.

Another object of the invention is to provide a seed planter having a novel seed dispensing mechanism.

Another object of the invention is to provide a seed planter having a plurality of soil and mulch cover piercing needles together with a seed and seed cover material dispensing means all operated by a ground driven wheel of the planter.

Other objects and advantages of the invention may be apparent from the following specification, appended claims and accompanying drawings in which:

FIG. 5 is an enlarged fragmentary sectional view taken from the line 5—5 of FIG. 1;

FIG. 6 is a fragmentary sectional view taken from the line 6—6 of FIG. 2 showing by broken lines relative positions of various elements of the mechanism of the seed planter of the invention during operation thereof;

FIG. 7 is a cross-sectional view of a plant row of soil with a plastic mulch cover thereover and showing a seed planting needle mechanism of the invention piercing the plastic mulch cover and in position to expand a cavity in the soil and deposit a seed and covering material thereover within the cavity formed by the needle mechanism;

Figures 1, 3:
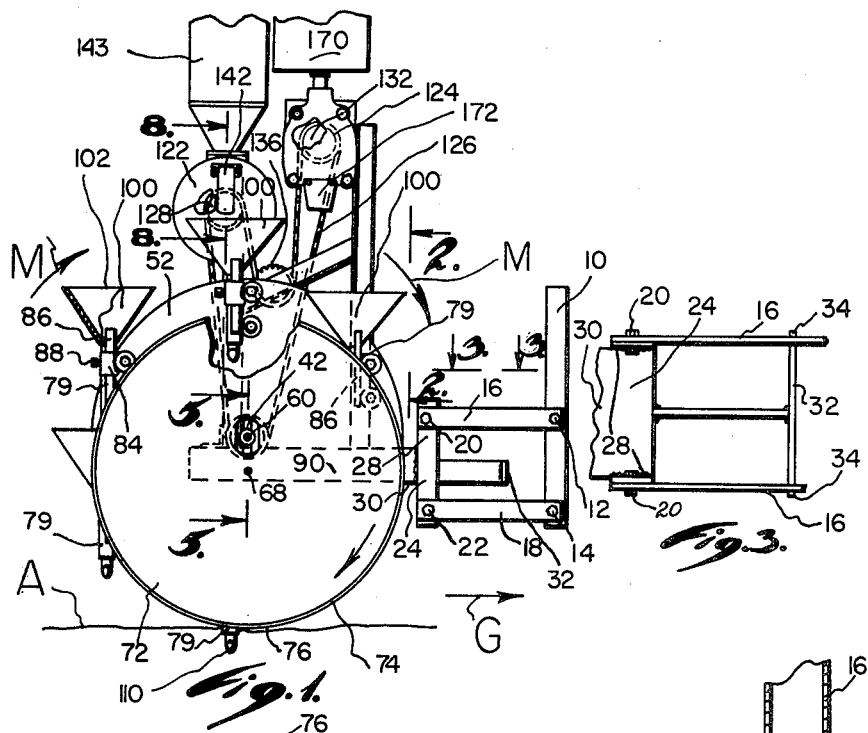
FIG. 1 is a side elevational view of the seed planter of the present invention showing portions broken away and in section to facilitate and amplify the illustration.
FIG. 3 is an enlarged fragmentary plan view taken from the line 3—3 of FIG. 1.

FIG. 8 is an enlarged fragmentary sectional view taken from the line 8—8 of FIG. 1 showing the seed dispenser mechanism of the invention and its relation to hoppers for receiving seed therefrom and for delivering such seed to the seed planting needle mechanism of the invention; and FIG. 9 is a fragmentary sectional view taken from the line 9—9 of FIG. 8 showing portions of the seed dispenser mechanism of the invention broken away to amplify the illustration.

As shown in FIG. 1 of the drawings, the invention is provided with an attachment frame 10 disposed to be connected with a conventional tool bar of a tractor or other suitable vehicle for towing the seed planter of the invention. Carried by the attachment frame 10 and pivotally mounted thereon by means of bolts 12 and 14 are parallel bars 16 and 18. These bars 16 and 18 may pivot about the horizontal axes of the bolts 12 and 14 and bolts 20 and 22 extending through opposite ends of the parallel bars 16 and 18 pivotally connect the bars 16 and 18 with a planter frame 24.

As shown in FIG. 3 of the drawings, it will be seen that this planter frame 24 is provided with a pair of vertical bars 28 connected to opposite sides of a substantially horizontal member 30. The bolts 20 extend through the bars 28 near their upper ends and pivotally connect the parallel bars 16 with the planter frame 24. Likewise, the bolts 22 extend through the lower ends of the bars 28 and pivotally connect the parallel bars 18 therewith.

A T-shaped structure 32 extends from the end of the planter frame 24 and is engageable with the bars 18 when it is desired to pick the planter up and carry it above the surface of the ground in connection with a conventional tool bar carried by a tractor or other vehicle. It will be seen that opposite end portions 34 of the T-shaped structure project laterally beyond the bars 18 which are directly below the bars 16, as shown in FIG. 3 of the drawings.

The frame member 30 of the planter frame 24, as shown in FIG. 5 of the drawings, is substantially box-shaped in cross section structure whereon a tubular shaft holding sleeve 36 is fixed by means of welding or other suitable means. This sleeve 36 is provided with internally screwthreaded bosses or nuts 38 wherein screwthreaded set screws 40 are disposed. These set screws 40 hold a shaft 42 in stationary position on the frame member 30 whereby the shaft 42 is maintained in a substantially axially horizontal position.

Fixed on the shaft 42 by means of a set screw 44 is a bearing sleeve 46 having bearings 48 operating in races and carrying a relatively rotatable bearing sleeve 50. Thus, the bearing sleeve 50 is freely rotatably supported on the shaft 42 and carries a disc 52 which rotates about the axis of the shaft 42.

Bolts 54 are screwthreaded into a flange 56 of the bearing sleeve 50 and these bolts 54 also support a sprocket 57 in connection with the plate 52 and the bearing sleeve 50, all as shown best in FIG. 5 of the drawings.

Supported in a transverse opening 58 in the shaft 42 by means of a set screw 60 is a bearing supporting shank 62. This bearing supporting shank 62 is provided with a cylindrical bearing sleeve 64 in which a bearing block 66 is rotatably mounted.

Figure 2:
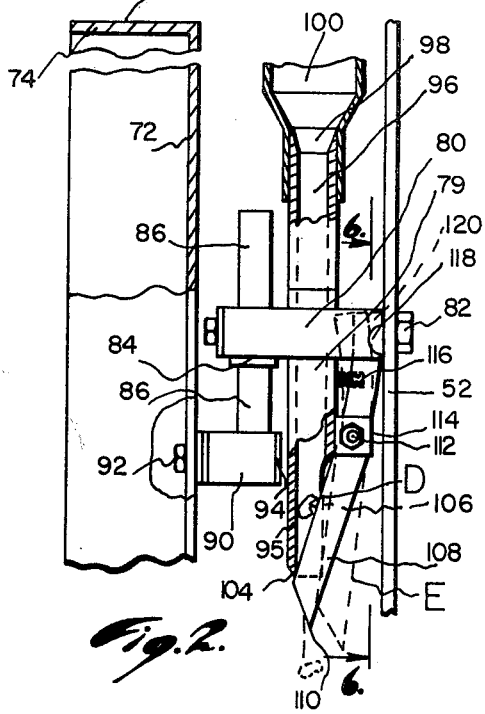
FIG. 2 is an enlarged fragmentary sectional view taken from the line 2—2 of FIG. 1 showing portions broken away and in section and showing parts in varying positions by broken lines.
Figure 4:
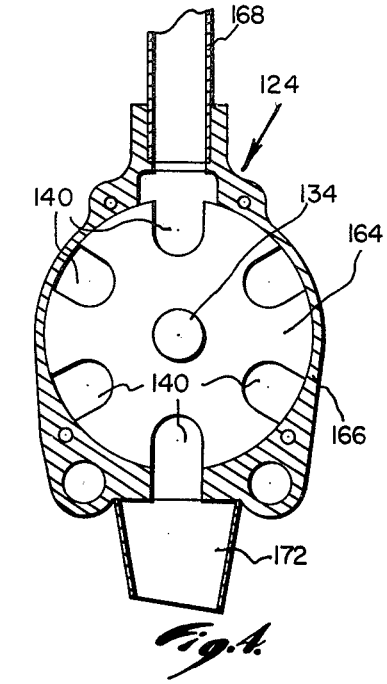
FIG. 4 is an enlarged vertical fragmentary sectional view of the seed cover materials dispenser of the invention.

A bolt 68 extending through a central opening 70 in a ground driven disc 72 pivotally connects this disc 72 with the bearing block 66 so that the disc 72 is rotatable about the axis of the bolt 68 which is axially parallel with the shaft 42 but displaced laterally therefrom so that the discs 52 and 72 are eccentric to each other, all as shown best in FIGS. 1 and 5 of the drawings. The disc 72, as shown in FIGS. 1 and 2 of the drawings, is provided with a peripheral rim 74 having an outer surface 76 engageable with the ground A, as shown in FIG. 1 of the drawings, for driving the mechanism of the planter of the invention, as will be hereinafter described in detail. As shown in FIG. 6 of the drawings, it will be seen that a peripheral portion 78 of the disc 52 is disposed above the ground-engaging periphery 76 of the disc 72. A plurality of seed planting needle mechanisms 79 are mounted between the discs 52 and 72, as will be hereinafter described in detail in connection with FIGS. 1 and 2 of the drawings.

Each of the seed planting needle mechanisms 79 is provided with a supporting bearing sleeve 80 pivotally mounted on the discs 52 by means of a bolt 82 which extends through an opening in the plate 52. Connected to each bearing sleeve 80 is a transverse holding sleeve 84 through which a shank 86 extends. Each shank 86 is vertically movable in its holding sleeve 84 and a set screw 88 in each holding sleeve 84 is disposed to clamp each shank 86 in a vertically adjusted position, as will be hereinafter described.

A bearing sleeve 90 is fixed to the normally lower end of each shank 86 and this sleeve 90 is similar to the bearing sleeve 64 of the shank 62, hereinbefore described and disclosed in FIG. 5 of the drawings. A bolt 92 as shown in FIG. 2 of the drawings, is connected to a bearing block 94 similar to the bearing block 66 hereinbefore described in connection with FIG. 5 of the drawings. Thus, each bearing block 94 is pivotally connected by means of a bolt 92 to the disc 72 and the axial spacing of the bolts 82 and 92 substantially equals the axial spacing of the bolts 68 and shaft 42, shown in FIG. 5 of the drawings. Thus, rotation of the disc 72 about the axis of the bolt 68 causes the disc 52 to rotate about the axis of the shaft 42 whereupon each shank 86 is constantly maintained in substantially vertical position, as indicated in FIG. 6 of the drawings. It will be seen that the bearing sleeves 80 and 90 may be maintained in substantially vertical superimposed relationship wherein an imaginary line B may pass vertically through the axes of the bearing sleeves 80 and 90 while a soil piercing needle 95 fixed to the bearing sleeve 80 will also be maintained in substantially axially vertical disposition, as indicated by broken line C, in FIG. 6 of the drawings.

Each soil piercing needle 95 comprises a hollow tubular member 96 having an upper open end 98 communicating with a fan-shaped funnel 100 having an upper open end 102. The fan-shaped funnel 100 is best shown in FIG. 1 of the drawings. Each soil piercing needle 95 is provided with a beveled and sharpened lower end 104 having a side wall portion 106 cut away forming a slot in which a needle bar 108 is disposed. This needle bar 108 is provided with a sharpened beveled lower end 110 projecting slightly below the beveled end portion 104 of the tubular needle member 95. The needle bar 108 is pivotally mounted on a pin 112 carried by a bracket 114 welded or otherwise secured to the outer side of the hollow needle member 95 above the cut out or slotted portion 106. A spring 116 is disposed between the hollow tubular needle member 95 and the upper end of the needle bar 108 above the axis of the pin 112 thereby tending to hold the lower end of the needle bar 108 in the open or slotted side wall portion 106 of the hollow tubular needle member 95 in order to retain a seed D therein until the needle bar 108 is pivoted outward to a broken line position E, as will be hereinafter described in detail. A curved cam member 118 is disposed adjacent each bearing sleeve 80 and is fixed on the disc 52 so that an upper end portion 120 of each needle bar 108 engages one of the cam members 118 when each planting needle assembly passes into a position as shown in FIG. 6 wherein the soil planting needle assembly 79, at its hollow needle portion 95, assumes an axial aligned position C. At this time, the beveled end portions 104 and 110 of the tubular needle member 95 and needle bar 108 are projected a considerable distance into the soil, as shown best in FIG. 1 of the drawings, and also in FIG. 7 of the drawings. At this time, the portion 120 of each needle bar 108 engages a respective cam 118 and causes spreading of the needle bar 108 to the broken line position E. This being occasioned by rotation of the discs 52 and 72 in the direction of the arrows F, as shown in FIG. 6 of the drawings.

With reference to FIGS. 1, 6 and 7 of the drawings, it will be seen that when the planter of the invention is drawn forward in the direction of the arrow G, that the periphery of the disc 72 rolls on the soil A thereby rotating the disc 72 about the axis of the bolt 68 and correspondingly rotating the disc 52 about the axis of the shaft 42 due to connections provided by the bolts 82 and 92 holding the bearing sleeves 80 and 90, as hereinbefore described. Thus, all of the planting needle assemblies 79 are maintained parallel with each other and in a substantially vertical disposition so that their hoppers 100 are held upwardly and so that the soil piercing needle assemblies, as shown in FIGS. 2 and 7 of the drawings, are directed downwardly.

When a planting row of soil is covered by a plastic mulch cover as shown in FIG. 7 of the drawings, the end 110 of each needle bar 108 initially pierces the cover before entering the soil.

The mulch cover H, shown in FIG. 7 of the drawings, may be a carbon impregnated polyethylene film or any other suitable thin material which is not part of the present invention but which is a conventional soil mulch cover.

Means of the present invention is provided to dispense seeds and seed covering materials into the hollow tubular needle members 95 via their hoppers 100.

Generally, this mechanism includes a seed dispenser 122 and a cover materials dispenser 124.

These dispensers are driven in coordination with the rotation of the discs 52 and 72 by means of the sprocket 57, shown in FIG. 5 of the drawings.

A chain 126 engages this sprocket 57 and passes over a sprocket 128 on a shaft 130 of the seed dispenser 122. The chain 126 also engages a sprocket 132 on a shaft 134 of the seed cover materials dispenser 124.

An idler sprocket 136 supports the chain 126 between the sprockets 128 and 132, all as shown best in FIG. 1 of the drawings. Thus, the chain 126 is an endless chain engaging the sprockets 57, 128, 132 and 136. The sprockets 57, 128 and 132 are preferably all the same size so that the disc 52 and shafts 130 and 134 all rotate at the same number of revolutions per minute.

Accordingly, as shown, there are a plurality of seed planting needle assemblies 79 which correspond in number with the number of seed dispensing pockets 138 in the seed dispenser 122, said number of seed planting needle assemblies 79 also corresponding with the number of seed materials cover dispensing pockets 140 in the seed materials cover dispenser 124, all as will be hereinafter described. Thus, in operation, as each hopper 100 passes under an outlet tube 142 of the seed dispenser 122, a seed is dropped in the respective hopper 100 whereupon the seed gravitates to the position D shown in FIGS. 2 and 7 of the drawings. Subsequently, as this hopper rotates to a position beneath the seed cover materials dispenser 124 cover materials are dispensed from one of the pockets 140 on top of the seed D in the positions shown in FIGS. 2 and 7 of the drawings, all of this being coordinated by connection with the driving chain 126 which receives its motive force from frictional engagement of the periphery of the disc 72 with the ground A, all as hereinbefore described.

The seed dispenser 122, as shown in FIGS. 1, 8 and 9 of the drawings, is mounted substantially above the disc 52 and is provided with a seed containing hopper 143 which dispenses seeds downwardly into a chamber 144 of a dispenser housing 146. The chamber 144 at 148 communicates with a lower portion 150 of a seed dispenser disc having seed carrying pockets 138 therein. These pockets consist of openings passing through the disc and communicating with seeds in the lower portion of the chamber 148 below the rotating axis of the disc 150 and shaft 130. The axes of the openings are disposed at an acute angle to the axis of the shaft 130 and are disposed to register with a corresponding angular opening 152 so that the lower portions of a respective pocket 138 and the dispenser opening 152 are inclined downwardly in a direction toward the dispenser tube 142. Since the pockets 138 are open on both sides of the disc 150, only a predetermined number of seeds or a seed of a certain size may be carried in the pocket 138 due to the fact that additional or excess seeds will drop out of the respective pocket 138 in a direction as indicated by an arrow K, in FIG. 8 of the drawings, said seeds which drop out of the pockets 138 as they register with the dispenser opening 152 fall downwardly into the lower cavity portion 148 so that they may subsequently be picked up by another of the pockets 138.

Accordingly, it will be appreciated that the disc 150, when driven by the shaft 130 causes one of the pockets 138 to register with the dispensing opening 152 each time one of the funnels 100 passes under the dispenser tube 142. The downwardly and outwardly declined disposition of the bottom portions of the pockets 138 and the dispenser opening 152 permits each seed or seeds carried by the pockets 138 to be effected by gravity so that they pass into the dispenser tube 142 and inasmuch as the disc 150 operates at very low speed, seeds have sufficient time to be relieved from each pocket 138 during their registry with the dispenser opening 152.

To insure movement of seeds from each pocket 138 as it registers with the dispensing opening 152, a stationarily mounted seed agitator 154 is pivotally mounted on a pin 156 and provided with an arm portion 158 hanging in a peripheral slot 160 in the disc 150. A counterweight portion 162 of the seed agitator 154 maintains the end portion 158 thereof in the slot 160 so that each seed in each pocket 138 engages the arm 158 and thus, the seed is caused to be removed from the respective pocket 138 and to fall through the dispenser opening 152 into the dispenser tube 142. As shown in FIG. 9 of the drawings, it will be seen that the dispenser opening 152 is considerably larger in cross section than the pockets 138. Thus, providing sufficient time, during rotation of the disc 150 relative to the dispenser opening 152, for seeds to fall from each pocket 138 through the opening 152 into the dispenser tube 142 and into the open end 102 of each hopper 100 as it passes thereunder.

The seed cover materials dispenser 124 driven by the chain 126 and sprocket 132 is provided with a rotor 164 mounted on the shaft 134 and rotatable in a housing 166. Communicating with the upper end of the housing 166 through a tube 168 is a hopper 170 in which seed covering materials are disposed. These seed covering materials may be vermiculite or any other equivalent material which may be used to cover seeds and which may have non-caking advantages or which may include various seed nutrients or other useful materials, as desired.

The seed covering materials pass downwardly through the tube 168 and into the pockets 140 and these pockets 140 dispense batches of materials intermittently through an outlet 172; each pocket 140 delivering an individual batch of seed covering materials to each hopper 100 as it passes thereunder subsequent to the receiving of a seed from the seed dispenser 122.

As indicated by arrows M in FIG. 1 of the drawings, each hopper 100 passes under the seed dispenser tube 142 before it passes under the tube 172 of the seed cover materials dispenser 124.

According to the foregoing, it will be seen that the seed planter of the present invention is capable of being operated longitudinally of a plant row of soil covered by a conventional plastic mulch soil cover. During the traverse of the seed planter of the invention over the cover H, as shown in FIG. 7 of the drawings, and in a direction as indicated by the arrow G in FIG. 1 of the drawings, the disc 72 is rotated by engagement of its rim 74 with the ground and as hereinbefore described the disc 52 is rotated on an axis laterally displaced from the axis of the disc 72 whereupon the seed planting needle assemblies 79 and each respective hopper 100 are all maintained in a substantially vertical plane as they successively pass under the seed dispenser 122 and the seed cover materials dispenser 124.

As each needle assembly 79 approaches the ground, the sharp end portion 110 of the needle bar 108 of each assembly 79 pierces the plastic cover H whereupon the upper end of each needle bar 108 is actuated by a cam 118 thereby spreading the needle bar 108 to the broken line postion shown in FIG. 2, permitting the seed D to pass downwardly into the cavity in the soil punched by the needle assembly 79 whereupon the seed covering materials, directly above the seed D and in the tubular structure of the needle member 95, fills the opening in the soil and covers the seed D so that the seed may subsequently grow up through the seed covering materials and outwardly through the opening as indicated at P, in FIG. 7 of the drawings. The cams 118 which are mounted on disc 52 cause the upper end portions 120 of each needle bar 108 to be pivoted about the pin 112 toward the disc 72 when the apparatus is in motion, thereby causing the opposite end of the needle bar 108 to move away from the hollow tubular soil piercing needle member 95, thus releasing the seed D and the seed covering materials. Accordingly, it will be appreciated by those skilled in the art that seeds may be precisely planted in the ground below an opening punched therein and that the seeds may be successively and automatically planted in precisely spaced relationship in accordance with spacing of the seed planting needle assembly 79 as they are subsequently rotated and forced into the ground through the plastic mulch cover H.

It will be obvious to those skilled in the art that the seed planter of the present invention may have particular advantages in the planting of various seeds under various conditions and that the use of the present seed planter is not limited to the planting of seeds through a plastic mulch cover H since this seed planter will operate in bare soil equally as well as it does through a plastic mulch cover as described herein:

It will be obvious to those skilled in the art that various modifications of the present invention may be resorted to in a manner limited only by a just interpretation of the following claims.

We claim:

1. In a seed planter the combination of: a frame; a pair of first and second plates; first means rotatably supporting one of said plates on said frame on a first substantially horizontal axis; second means supporting the other one of said plates on said frame on a second substantially horizontal axis, said first and second axes substantially parallel to each other and laterally spaced apart; a seed planting needle assembly; third means pivotally connecting said seed planting needle assembly to said first plate; fourth means pivotally connecting said needle assembly to said second plate; said third and fourth means having pivotal axes spaced from each other a distance substantially equal to the spacing of said first and second axes; a hollow tubular seed holding member on said needle assembly disposed, at its normally lower end, to be projected downwardly into soil; a needle bar of said needle assembly pivoted to open and close said lower end of said hollow tubular seed holding member; cam means on one of said plates disposed to be engaged by said needle bar for pivoting it into position to open said lower end of said hollow tubular seed holding member when it is projected into the ground by concurrent rotation of said plates about their pivotal axes, one of said plates being disc shaped and having a peripheral portion disposed to engage the ground and to thereby rotate both of said plates when moved over the ground and means for transmitting said frame along a plant row of soil.

2. In a seed planter the combination of: a frame; a pair of first and second plates; first means rotatably supporting one of said plates on said frame on a first substantially horizontal axis; second means supporting the other one of said plates on said frame on a second substantially horizontal axis; said first and second axes substantially parallel to each other and laterally spaced apart; a seed planting needle assembly; third means pivotally connecting said seed planting needle assembly to said first plate; fourth means pivotally connecting said needle assembly to said second plate; said third and fourth means having pivotal axes spaced from each other a distance substantially equal to the spacing of said first and second axes; a hollow tubular seed holding member on said needle assembly disposed, at its normally lower end, to be projected downwardly into soil; a needle bar of said needle assembly pivoted to open and close said lower end of said hollow tubular seed holding member; cam means on one of said plates disposed to be engaged by said needle bar for pivoting it into position to open said lower end of said hollow tubular seed holding member when it is projected into the ground by concurrent rotation of said plates about their pivotal axes; a spring tending to pivot said needle bar into position to close said lower end of said hollow tubular seed holding member; one of said plates being disc-shaped and having a peripheral portion disposed to engage the ground and to thereby rotate both of said plates when moved over the ground and means for transmitting said frame along a plant row of soil.

3. In a seed planter the combination of: a frame; a pair of first and second plates; first means rotatably supporting one of said plates on said frame on a first substantially horizontal axis; second means supporting the other one of said plates on said frame on a second substantially horizontal axis, said first and second axes substantially parallel to each other and laterally spaced apart; a seed planting needle assembly; third means pivotally connecting said seed planting needle assembly to said first plate; fourth means pivotally connecting said needle assembly to said second plate; said third and fourth means having pivotal axes spaced from each other a distance substantially equal to the spacing of said first and second axes; a hollow tubular seed holding member on needle assembly disposed, at its normally lower end, to be projected downwardly into soil; a needle bar of said needle assembly pivoted to open and close said lower end of said hollow tubular seed holding member; cam means on one of said plates disposed to be engaged by said needle bar for pivoting it into position to open said lower end of said hollow tubular seed holding member when it is projected into the ground by concurrent rotation of said plates about their pivotal axes; one of said plates being disc-shaped and having a peripheral portion disposed to engage the ground and to thereby rotate both of said plates when moved over the ground; a seed dispenser disposed above said plates; fifth means coupled to one of said plates and to said seed dispenser for actuating said seed dispenser when said plates are drawn along a plant row of soil; and sixth means disposed to deliver seeds from said dispenser into said hollow tubular member of said needle assembly.

4. In a seed planter the combination of: a frame; a pair of first and second plates; first means rotatably supporting one of said plates on said frame on a first substantially horizontal axis; second means supporting the other one of said plates on said frame on a second substantially horizontal axis; said first and second axes substantially parallel to each other and laterally spaced apart; a seed planting needle assembly; third means pivotally connecting said seed planting needle assembly to said first plate; fourth means pivotally connecting said needle assembly to said second plates; said third and fourth means having pivotal axes spaced from each other a distance substantially equal to the spacing of said first and second axes; a hollow tubular seed holding member on said needle assembly disposed, at its normally lower end, to be projected downwardly into soil; a needle bar of said needle assembly pivoted to open and close said lower end of said hollow tubular seed holding member; cam means on one of said plates disposed to be engaged by said needle bar for pivoting it into position to open said lower end of said hollow tubular seed holding member when it is projected into the ground by concurrent rotation of said plates about their pivotal axes; one of said plates being disc-shaped and having a peripheral portion disposed to engage the ground and to thereby rotate both of said plates when moved over the ground; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of said needle assembly; and a funnel of said sixth means carried by and communicating with the upper end of said hollow tubular member.

5. In a seed planter the combination of: a frame; a pair of first and second plates; first means rotatably supporting one of said plates on said frame on a first substantially horizontal axis; second means supporting the other one of said plates on said frame on a second substantially horizontal axis; said first and second axes substantially parallel to each other and laterally spaced apart; a seed planting needle assembly; third means pivotally connecting said seed planting needle assembly to said first plate; fourth means pivotally connecting said needle assembly to said second plates; said third and fourth means having pivotal axes spaced from each other a distance substantially equal to the spacing of said first and second axes; a hollow tubular seed holding member on said needle assembly disposed, at its normally lower end, to be projected downwardly into soil; a needle bar of said needle assembly pivoted to open and close said lower end of said hollow tubular seed holding member; and cam means on one of said plates disposed to be engaged by said needle bar for pivoting it into position to open said lower end of said hollow tubular seed holding member when it is projected into the ground by concurrent rotation of said plates about their pivotal axes; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of said needle assembly; a housing for said seed dispenser; a rotary plate member having opposite sides rotatably mounted in said housing; a seed containing chamber in said housing; a portion of said rotary plate member rotatable through said chamber; said rotary plate member having a seed pick-up pocket extending substantially axially therethrough; said housing having a seed outlet above said chamber and disposed at a location with which said pocket intermittently aligns when said rotary plate member rotates in said housing; said pocket open at one of said opposed sides of said rotary plate member adjacent said outlet; said pocket also open at the other side of said rotary plate member above said chamber whereby excess seeds picked up by said pocket may fall therefrom and backwardly into said chamber.

6. In a seed planter the combination of: a frame; a pair of first and second plates; first means rotatably supporting one of said plates on said frame on a first substantially horizontal axis; second means supporting the other one of said plates on said frame on a second substantially horizontal axis, said first and second axes substantially parallel to each other and laterally spaced apart; a seed planting needle assembly; third means pivotally connecting said seed planting needle assembly to said first plate; fourth means pivotally connecting said needle assembly to said second plate; said third and fourth means having pivotal axes spaced from each other a distance substantially equal to the spacing of said first and second axes; a hollow tubular seed holding member on needle assembly disposed, at its normally lower end, to be projected downwardly into soil; a needle bar of said needle assembly pivoted to open and close said lower end of said hollow tubular seed holding member; and cam means on one of said plates disposed to be engaged by said needle bar for pivoting it into position to open said lower end of said hollow tubular seed holding member when it is projected into the ground by concurrent rotation of said plates about their pivotal axes; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of said needle assembly; a seed cover materials dispenser disposed adjacent said seed dispenser and located to dispense seed covering materials into said hollow tubular seed holding member on top of said seed dispensed thereinto by said seed dispenser.

7. In a seed planter the combination of: a frame; a pair of first and second plates; first means rotatably supporting one of said plates on said frame on a first substantially horizontal axis; second means supporting the other one of said plates on said frame on a second substantially horizontal axis; said first and second axes substantially parallel to each other and laterally spaced apart; a seed planting needle assembly; third means pivotally connecting said seed planting needle assembly to said first plate; fourth means pivotally connecting said needle assembly to said second plate; said third and fourth means having pivotal axes spaced from each other a distance substantially equal to the spacing of said first and second axes; a hollow tubular seed holding member on said needle assembly disposed, at its normally lower end, to be projected downwardly into soil; a needle bar of said needle assembly pivoted to open and close said lower end of said hollow tubular seed holding member; and cam means on one of said plates disposed to be engaged by said needle bar for pivoting it into position to open said lower end of said hollow tubular seed holding member when it is projected into the ground by concurrent rotation of said plates about their pivotal axes; a spring tending to pivot said needle bar into position to close said lower end of said hollow tubular seed holding member; one of said plates being disc-shaped and having a peripheral portion disposed to engage the ground and to thereby rotate both of said plates when moved over the ground; and hitch means to which said plates are rotatably mounted whereby said seed planter may be drawn along a plant row of soil.

8. In a seed planter the combination of: a frame; a pair of first and second plates; first means rotatably mounting one of said plates on said frame on a first substantially horizontal axis; second means rotatably supporting the other one of said plates on said frame on a second substantially horizontal axis, said first and second axes substantially parallel to each other and laterally spaced apart; a plurality of seed planting needle assemblies; third means pivotally connecting each needle assembly to said first plate; fourth means pivotally connecting each needle assembly to said second plate; said third and fourth means having respective pivotal axes spaced from each other a distance substantially equal to the spacing of said first and second axes; a hollow tubular seed holding member of each needle assembly disposed at its normally lower end, to be projected downwardly into soil; a needle bar of each needle assembly pivoted to open and close said lower end of a respective hollow tubular seed holding member; and cam means on one of said plates disposed to be engaged by each respective needle bar for pivoting it into position to open said lower end of a respective hollow tubular seed holding member when it is projected into the ground by concurrent rotation of said plates about their pivotal axes; a seed dispenser disposed above said plates; fifth means coupled to one of said plates and to said seed dsipenser for actuating said seed dispenser when said plates are drawn along a plant row of soil; sixth means disposed to deliver seeds from said dispenser into said hollow tubular member of each of said needle assemblies; a housing for said seed dispenser; a rotary plate member rotatably mounted in said housing; a seed containing chamber in said housing; a portion of said rotary plate member rotatably mounted through said chamber; said rotary plate member having a plurality of seed pick up pockets extending substantially axially therethrough; said housing having a seed outlet opening above said chamber and disposed at a location with which said pockets intermittently align when said rotary plate member rotates in said housing; said pockets open at one side of said rotary plate member adjacent said outlet; said pockets also open at another side of said rotary plate member above said chamber whereby excess seeds picked up by said pockets may fall therefrom backwardly into said chamber; said plurality of needle assemblies being equal in number to the number of pockets in said rotary plate member; means coupled to one of said pair of said first and second plates for operating said seed dispenser in unison therewith whereby each pocket of said seed dispenser is operably disposed to dispense a seed into one of said hollow tubular seed holding members of a respective needle assembly.

9. In a seed planter the combination of: a frame; a pair of first and second plates; first means rotatably mounting one of said plates on said frame on a first substantially horizontal axis; second means rotatably supporting the other one of said plates on said frame on a second substantially horizontal axis, said first and second axes substantially parallel to each other and laterally spaced apart, a plurality of seed planting needle assemblies; third means pivotally connecting each needle assembly to said first plate; fourth means pivotally connecting each needle assembly to said second plate; said third and fourth means having respective pivotal axes spaced from each other a distance substantially equal to the spacing of said first and second axes; a hollow tubular seed holding member of each needle assembly disposed at its normally lower end, to be projected downwardly into soil; a needle bar of each needle assembly pivoted to open and close said lower end of a respective hollow tubular seed holding member; and cam means on one of said plates disposed to be engaged by each respective needle bar for pivoting it into position to open said lower end of a respective hollow tubular seed holding member when it is projected into the ground by concurrent rotation of said plates about their pivotal axes; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of each of said needle assemblies; a housing for said seed dispenser, a rotary plate member rotatably mounted in said housing; a seed containing chamber in said housing; a portion of said rotary plate member rotatably mounted through said chamber; said rotary plate member having a plurality of seed pick up pockets extending substantially axially therethrough; said housing having a seed outlet opening above said chamber and disposed at a location with which said pockets intermittently align when said rotary plate member rotates in said housing; said pockets open at one side of said rotary plate member adjacent said outlet; said pockets also open at another side of said rotary plate member above said chamber whereby excess seeds picked up by said pockets may fall therefrom backwardly into said chamber; means coupled to one of said pair of said first and second plates for operating said seed dispenser in unison therewith whereby each pocket of said seed dispenser is operably disposed to dispense a seed into one of said hollow tubular seed holding members of a respective needle assembly.

10. In a seed planter the combination of: a frame; a pair of first and second plates; first means rotatably mounting one of said plates on said frame on a first substantially horizontal axis; second means rotatably supporting the other one of said plates on said frame on a second substantially horizontal axis, said first and second axes substantially parallel to each other and laterally spaced apart; a plurality of seed planting needle assemblies; third means pivotally connecting each needle assembly to said first plate; fourth means pivotally connecting each needle assembly to said second plate; said third and fourth means having respective pivotal axes spaced from each other a distance substantially equal to the spacing of said first and second axes, a hollow tubular seed holding member of each needle assembly disposed at its normally lower end, to be projected downwardly into soil; a needle bar of each needle assembly pivoted to open and close said lower end of a respective hollow tubular seed holding member; and cam means on one of said plates disposed to be engaged by each respective needle bar for pivoting it into position to open said lower end of a respective hollow tubular seed holding member when it is projected into the ground by concurrent rotation of said plates about their pivotal axes; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of each of said needle assemblies; a housing for said seed dispenser; a rotary plate member rotatably mounted in said housing; a seed containing chamber in said housing; a portion of said rotary plate member rotatably mounted through said chamber; said rotary plate member having a plurality of seed pick up pockets extending substantially axially therethrough; said housing having a seed outlet opening above said chamber and disposed at a location with which said pockets intermittently align when said rotary plate member rotates in said housing; said pockets open at one side of said rotary plate member adjacent said outlet; said pockets also open at another side of said rotary plate memebr above said chamber whereby excess seeds picked up by said pockets may fall therefrom backwardly into said chamber; said rotary plate member having an annular slot in the periphery thereof; said annular slot extending through said pocket, a seed removal member mounted on said housing and extending into said annular slot adjacent said seed outlet opening; means coupled to one of said pair of said first and second plates for operating said seed dispenser in unison therewith whereby each pocket of said seed dispenser is operably disposed to dispense a seed into one of said hollow tubular seed holding members of a respective needle assembly.

11. In a seed planter the combination of: a frame; a pair of first and second plates; first means rotatably mounting one of said plates on said frame on a first substantially horizontal axis; second means rotatably supporting the other one of said plates on said frame on a second substantially horizontal axis, said first and second axes substantially parallel to each other and laterally spaced apart; a plurality of seed planting needle assemblies; third means pivotally connecting each needle assembly to said first plate; fourth means pivotally connecting each needle assembly to said second plate; said third and fourth means having respective pivotal axes spaced from each other a distance substantially equal to the spacing of said first and second axes, a hollow tubular seed holding member of each needle assembly disposed at its normaly lower end, to be projected downwardly into soil; a needle bar of each needle assembly pivoted to open and close said lower end of a respective hollow tubular seed holding member; and cam means on one of said plates disposed to be engaged by each respective needle bar for pivoting it into position to open said lower end of a respective hollow tubular seed holding member when it is projected into the ground by concurrent rotation of said plates about their pivotal axes; a seed dispenser disposed above said plates; fifth means coupled to one of said plates and to said seed dispenser for actuating said seed dispenser when said plates are drawn along a plant row of soil; sixth means disposed to deliver seeds from said dispenser into said hollow tubular member of each of said needle assemblies; a housing for said seed dispenser; a rotary plate member rotatably mounted in said housing; a seed containing chamber in said housing; a portion of said rotary plate member rotatably mounted through said chamber; said rotary plate member having a plurality of seed pick up pockets extending substantially axially therethrough; said housing having a seed outlet opening above said chamber and disposed at a location with which said pockets intermittently align when said rotary plate member rotates in said housing; said pockets open at one side of said rotary plate member adjacent said outlet; said pockets also open at another side of said rotary plate member above said chamber whereby excess seeds picked up by said pockets may fall therefrom backwardly into said chamber; said rotary plate member having an annular slot in the periphery thereof; said annular slot extending through said pocket, a seed removal member mounted on said housing and extending into said annular slot adjacent said seed outlet opening; said seed removal member pivotally mounted on said housing; means coupled to one of said pair of said first and second plates for operating said seed dispenser in unison therewith whereby each pocket of said seed dispenser is operably disposed to dispense a seed into one of said hollow tubular seed holding members of a respective needle assembly.

12. In a seed planter the combination of: a frame; a pair of first and second plates; first means rotatably mounting one of said plates on said frame on a first substantially horizontal axis; second means rotatably supporting the other one of said plates on said frame on a second substantially horizontal axis, said fiirst and second axes substantially parallel to each other and laterally spaced apart; a plurality of seed planting needle assemblies; third means pivotally connecting each needle assembly to said first plate; fourth means pivotally connecting each needle assembly to said second plate; said third and fourth means having respective pivotal axes spaced from each other a distance substantially equal to the spacing of said first and second axes; a hollow tubular seed holding member of each needle assembly disposed at its normally lower end, to be projected downwardly into soil; a needle bar of each needle assembly pivoted to open and close said lower end of a respective hollow tubular seed holding member; and cam means on one of said plates disposed to be engaged by each respective needle bar for pivoting it into position to open said lower end of a respective hollow tubular seed holding member when it is projected into the ground by concurrent rotation of said plates about their pivotal axes, a seed dispenser disposed above said plate; fifth means coupled to one of said plates and to said seed dispenser for actuating said seed dispenser when said plates are drawn along a plant row of soil; sixth means disposed to deliver seeds from said dispenser into said hollow tubular member of each of said needle assemblies; a housing for said seed dispenser; a rotary plate member rotatably mounted in said housing; a seed containing chamber in said housing; a portion of said rotary plate member rotatably mounted through said chamber; said rotary plate member having a plurality of seed pick up pockets extending substantially axially therethrough; said housing having a seed outlet opening above said chamber and disposed at a location with which said pockets intermittently align when said rotary plate member rotates in said housing; said pockets open at one side of said rotary plate member adjacent said outlet; said pockets also open at another side of said rotary plate member above said chamber whereby excess seeds picked up by said pockets may fall therefrom backwardly into said chamber; said pockets of said rotary plate member having a bottom portion which declines downwardly toward said outlet when said pockets are aligned therewith; means coupled to one of said pair of said first and second plates for operating said seed dispenser in unison therewith whereby each pocket of said seed dispenser is operably disposed to dispense a seed into one of said hollow tubular seed holding members of a respective needle assembly.

References Cited in the file of this patent

UNITED STATES PATENTS

| | | |
|---|---|---|
| 518,979 | Wilson | May 1, 1894 |
| 648,260 | Holum | Apr. 24, 1900 |
| 1,098,416 | Vega | June 2, 1914 |
| 1,474,599 | Martin | Nov. 20, 1923 |
| 2,440,846 | Cannon | May 4, 1948 |
| 2,486,462 | Carelock | Nov. 1, 1949 |
| 2,515,351 | Loucks | July 18, 1950 |
| 3,000,450 | Jongeneel | Sept. 19, 1961 |

FOREIGN PATENTS

| | | |
|---|---|---|
| 658,498 | France | Jan. 26, 1929 |
| 1,145,832 | France | May, 13, 1957 |
| 422,252 | Germany | Nov. 30, 1925 |